United States Patent [19]

Hung

[11] Patent Number: 5,843,528
[45] Date of Patent: Dec. 1, 1998

[54] CHEMICALLY MODIFIED CARBONACEOUS MATERIALS MADE BY THE DEFLUORINATION OF GRAPHITE FLUORIDE AND PROCESS THEREFOR

[76] Inventor: Ching-Cheh Hung, 24667 Meadow La., Westlake, Ohio 44145

[21] Appl. No.: 769,238

[22] Filed: Dec. 18, 1996

Related U.S. Application Data

[62] Division of Ser. No. 258,961, Jun. 13, 1994, Pat. No. 5,622,683.

[51] Int. Cl.$^6$ .................................................. C23C 16/06
[52] U.S. Cl. ...................... 427/249; 427/250; 427/255.4; 427/228; 423/460; 423/448; 423/414; 423/439
[58] Field of Search ...................................... 423/460, 448, 423/414, 439; 520/240; 252/502; 427/248.1, 249, 250, 225.4, 228

[56] References Cited

U.S. PATENT DOCUMENTS 4,116,880  9/1978  Olah .................... 252/429 R

FOREIGN PATENT DOCUMENTS 1049582  11/1966  United Kingdom .

*Primary Examiner*—Shrive P. Beck
*Assistant Examiner*—Timothy Meeks
*Attorney, Agent, or Firm*—Donald A. Bergquist

[57] ABSTRACT

A method of making chemically modified carbon-based composite materials for engineering purposes from a precursor containing graphite fluoride by using halocarbons or elemental sulfur as chemical agents that diffuse into the lamellar crystal structure of the graphite fluoride and permit defluoridation at a controlled rate upon heating, to produce a graphite fluoride-free intermediate carbon material and, upon further heating to form a chemically modified carbon that is further heated in the presence of a specified one of several chemical elements to form a composite including a coating of the specified element.

8 Claims, 7 Drawing Sheets

CHEMICALLY MODIFIED CARBONACEOUS MATERIALS MADE BY THE DEFLUORINATION OF GRAPHITE FLUORIDE AND PROCESS THEREFOR

This is a Division of application Ser. No. 08/258,961, filed Jun. 13, 1994, now U.S. Pat. No. 5,622,683.

ORIGIN OF THE INVENTION

The invention described herein was made by an employee of the U.S. Government and may be manufactured and used by or for the Government for governmental purposes without the payment of any royalties thereon or therefor.

INTRODUCTION

This invention is concerned with processes applied to a fluorinated carbonaceous material commonly referred to as graphite fluoride ($\{CF_x\}_n$) and with the products that are obtained by subjecting the graphite fluoride to these processes. The products are believed to have physical and chemical properties that make them particularly interesting and useful in the production of carbon-based composites for use as engineering materials.

Background

Graphite fluoride ($\{CF_x\}_n$, where $1.0 \geq x \geq 0.5$) is a chemical substance that comprises the lamellar structure of carbon atoms in a graphite lattice with atoms of fluorine interposed between the graphitic planes. It differs from what is called fluorine-intercalated graphite in several respects. For one, the fluorine is not easily removed from the graphite fluoride by simple heating to temperatures at which the intercalated product would freely release its intercalate. Typically, the intercalated product will freely release most of the fluorine intercalate at temperatures in the range of 350° C. to 400° C. The interlamellar spacing for graphite fluoride, which is thought to be a mixture of two different compounds having interlamellar spacings of 5.9 and 8.8 Å (Ångström unit: 1 Å=$1.0 \times 10^{-10}$ m), falls in a range between those values and depends upon the reaction temperature. This variability suggests that the ratio of the two compounds, thought to be $\{CF\}_n$, known to have an interlamellar spacing of approximately 5.9 Å, and $\{C_2F\}_n$, known to have an interlamellar spacing of approximately 8.8 Å, depends upon the reaction temperature. The fluorine atoms in graphite fluoride are covalently bonded to the carbon atoms, not just residing in the interstitial spaces as is true in fluorine-intercalated graphite. The intercalated product has a higher conductivity than does the pristine graphite from which it is made. In contrast, graphite fluoride has a conductivity that is orders of magnitude lower than that of the pristine graphite from which it is made.

For convenience in referring to various compositions of graphite fluoride and similar lamellar structures in this disclosure, the $\{\ \}_n$ will be omitted, but the reader is to understand that these are polymer-like structures having an indefinite number of replications, n, in the overall structure.

Prior Art

Graphite fluoride has been considered to be inert at temperatures lower than 400° C. Above 400° C., however, defluorination occurs. Significant numbers of carbon atoms are carried off with the fluorine atoms. Under certain conditions this exothermic reaction might be considered explosive because the thermal energy released raises the temperature of the mass of $CF_x$ and accelerates the reaction. The amount of energy released is testament to the fact that chemical bonds are being broken, further demonstrating that graphite fluoride is not the same as fluorine-intercalated graphite. In theory, at least, if the heat from the reaction can be dissipated quickly enough, the rate of defluorination can be controlled.

Recent studies have demonstrated that graphite fluoride fibers having diameters in the 10–15 μm (i.e., $10-15 \times 10^{-6}$ m) range can release fluorine slowly at temperatures in the range of 300° C. to 500° C. in a nitrogen or air atmosphere. In a bromine atmosphere, such defluorination can take place at temperatures above 350° C.

High-modulus materials are materials having a high modulus of elasticity (i.e., Young's modulus, defined as change in stress divided by the concomitant change in strain), compared to the modulus of elasticity of the "normal" or "annealed" material. To some extent, changes in Young's modulus may be qualitatively (at least) linked to structural changes at the molecular level. Sometimes the structural changes may appear as residual stress within the material. For a given material, the Young's modulus is a function of numerous factors that are dependent upon the physical, chemical, and thermal processes the material has undergone. A classic example is seen in polyethylene, which has a modest value for Young's modulus in tension up to its yield point, at which stress the Young's modulus decreases drastically with further stress, producing inelastic deformation in the 30-percent range while the polymer chains become ordered and aligned, after which the modulus increases drastically, compared with the material's original modulus. Heat-treating, a process involving first heating and then quenching, is used to harden metals (i.e., to increase the Young's modulus and compressive strength, at least on the surface) while not changing the chemical makeup of the metal. Polymers are often given higher Young's modulus by creating cross-linking of adjacent polymer chains, which really represents a chemical change of the polymer but the change is insignificant to the overall chemistry of the polymer.

High-modulus carbon materials in general, and high-modulus carbon fibers in particular, are made by heating carbon-based materials (e.g., methane, carbonaceous pitch, rayon, or oxygenated polyacrylonitrile (PAN)), sometimes with catalysts and always in an inert environment, at a temperature of up to 3000° C. It is known that, when the carbon material is to be used in a matrix to form composite for use as an engineering material or structure, the surface of the carbon materials may be modified or "surface treated" after the high-temperature treatment, to improve adhesion between the carbon material and the continuous phase of the matrix. For example, the surface of a fibrous carbon material, or carbon (graphite) yarn can be modified for producing stronger composites by a continuous process of coating the carbon yarn with a metal halide and heating the coated yarn in a halogen-containing atmosphere at temperatures higher than 300° C., as taught by Cass in U.S. Pat. No. 3,627,571.

Carbon fiber-metal matrix composites and carbon fiber-ceramic matrix composites can be made by blending chopped fibers and the appropriate matrix-forming materials together and hot-pressing them at high pressure and at a temperature above the sintering point of the matrix material. For best results, the fibers may be pre-coated with metals or silicon to provide a good bond between the fiber and the matrix.

In other processes, the carbon fibers may be. laid down in a regular pattern of directional alignment in layers having the same or different directional alignment and subsequently treated with a metal or other selected matrix material under conditions of heat and pressure, thereby to bond the fibers to the matrix in a fashion that provides a final composite with uniquely-designed directional physical properties.

In the prior art of defluorination of graphite fluoride, the defluorination process is difficult to control, even in inert atmospheres of nitrogen, helium, argon, or the like. The reaction below 400° C. is slow and incomplete. The reaction above 400° C. may be complete, but is rapid to the point of being explosive. Fluorine atoms released carry off significant numbers of carbon atoms in the process. Consequently, the resulting defluorinated carbon materials suffer from structural damage and are, therefore, not very useful in providing strength to a composite made therefrom.

Defluorination of graphite fluoride by heating to 350° C. in a bromine atmosphere has been used with results that are better than those obtained from heating in inert atmospheres. There is still structural damage and, because the bromine atom is large and can form only one bond with the carbon lattice, it cannot effect substantial "chemical healing" of the carbon structure.

Although some carbon materials have a naturally high modulus, they do not exist in a physical form of size and shape to be useful in engineering applications, particularly in carbon-reinforced composite materials. Artificially-produced carbon fibers having high modulus and acceptable tensile strength have been developed by the expenditure of considerable amounts of time and money in long-term research programs both in the public sector (within the National Aeronautics and Space Administration and other government-funded organizations) and in the private sector (within companies such as Union Carbide Corporation and Amoco Corporation, for example). This expenditure of research efforts is reflected in a high price for commercially-available high-modulus carbon fibers. The present pricing structure is such that the price of carbon fibers increases exponentially with increasing modulus, or so it seems.

Because metals and ceramics in their liquid or semi-liquid phases do not wet carbon, carbon fiber-metal matrix composites and carbon fiber-ceramic matrix composites in tensile tests commonly have failure modes that involve weak bonding between the fiber and the matrix. Efforts are often directed to improving this bonding. This disclosure describes steps toward this end.

SUMMARY OF THE INVENTION

Whereas this invention deals with the defluorination of graphite fluoride, a term that covers a chemical compound having a range of stoichiometric ratios of carbon and fluorine, which has historically been difficult'to satisfactorily defluorinate to leave a useful carbon structure behind, numerous advantages spring from this invention.

It is therefore an object of this invention to provide a process to defluorinate graphite fluoride compounds, which process causes less structural damage to the graphite lattice remaining after defluorination, which process accomplishes this goal with reasonable speed with respect to prior processes that may accomplish this, and which process produces new and useful carbon materials that have new structure and new physical and chemical properties that are desirable for engineering purposes.

It is an object of this invention to produce a graphite product, the carbon layers of which are cross-linked and stable at 2700° C. in argon. Graphitized carbon fibers having these features can have very high modulus at a moderate cost.

It is an object of this invention to present a method to chemically heal structural damage in carbon fibers.

It is an object of this invention to present a process for producing carbon having metal elements on the surface, which products will produce carbon-metal matrix composites with strong bonding between the carbon and the metal matrix.

It is an object of this invention to present a process for producing carbon having silicon on the surface, which products will produce carbon-ceramic matrix composites with strong bonding between the carbon and the ceramic matrix.

It is an object of this invention to present a process to produce an "activated graphite", physically the same as graphite but much more chemically reactive than conventional graphite. This product is potentially useful for collecting certain metals (e.g., manganese) from mixtures at high temperatures. It also has other potential uses.

It is an object of this invention to present a process to produce a new compound, $CS_x$ ($0<x\leq1$), or carbon sulfide, in a two-dimensional structure. Fibers of $CS_{0.03-0.1}$ were found to be stable at 1100° C. in an inert environment, are more flexible and are much easier to handle than the original carbon fiber used as a starting material.

It is an object of this invention to present a process to produce a new intercalated graphite compound from carbon materials having a low degree of graphitization.

It is an object of this invention to present a process to produce much higher levels of intercalate (iron in $FeCl_xF_y$) concentration than heretofore attainable. Such a product can be further heat treated to form carbon with iron oxide near and on the surface thereof for improved adhesion between the carbon and a ceramic matrix in carbon-ceramic matrix composites.

These and other objects of this invention will become readily apparent to the reader as the description of this invention is read and understood.

BRIEF DESCRIPTION OF THE DRAWINGS

The advantages and novel features of the invention will be more fully apparent when read in connection with the accompanying drawings wherein.

BEST MODE FOR CARRYING OUT THE INVENTION

According to the present invention, graphite fluoride is defluorinated under conditions that allow complete reaction at controlled rates that not only prevent damage to the carbonaceous structure of the material but is seen to effect a "chemical healing" of defects in that structure in some cases and a stabilizing, strengthening, and, in some cases, a physical growth of the structure, including a gain in mass thereof. Products of the methods taught in this disclosure appear to be more chemically reactive than are the original carbon materials from which the graphite fluoride was made.

Indeed, the chemical reactivity of some of these materials are seen to be unique among carbonaceous materials, especially those carbon materials used in producing carbon-reinforced composite materials in resin, metal, or ceramic matrices. In these composite materials, intimate physical or chemical bonding between the matrix and the reinforcing filler, which may be carbon fibers, is important to the utility of the engineered product fabricated from the composite. Thus, the performance of these high-tech engineered end products, upon which lives and valuable property may depend, is effected and affected by the microscopic and sub-microscopic structure relating to the structural strength and the bonding of the individual pieces of the reinforcing material.

Figure 1:
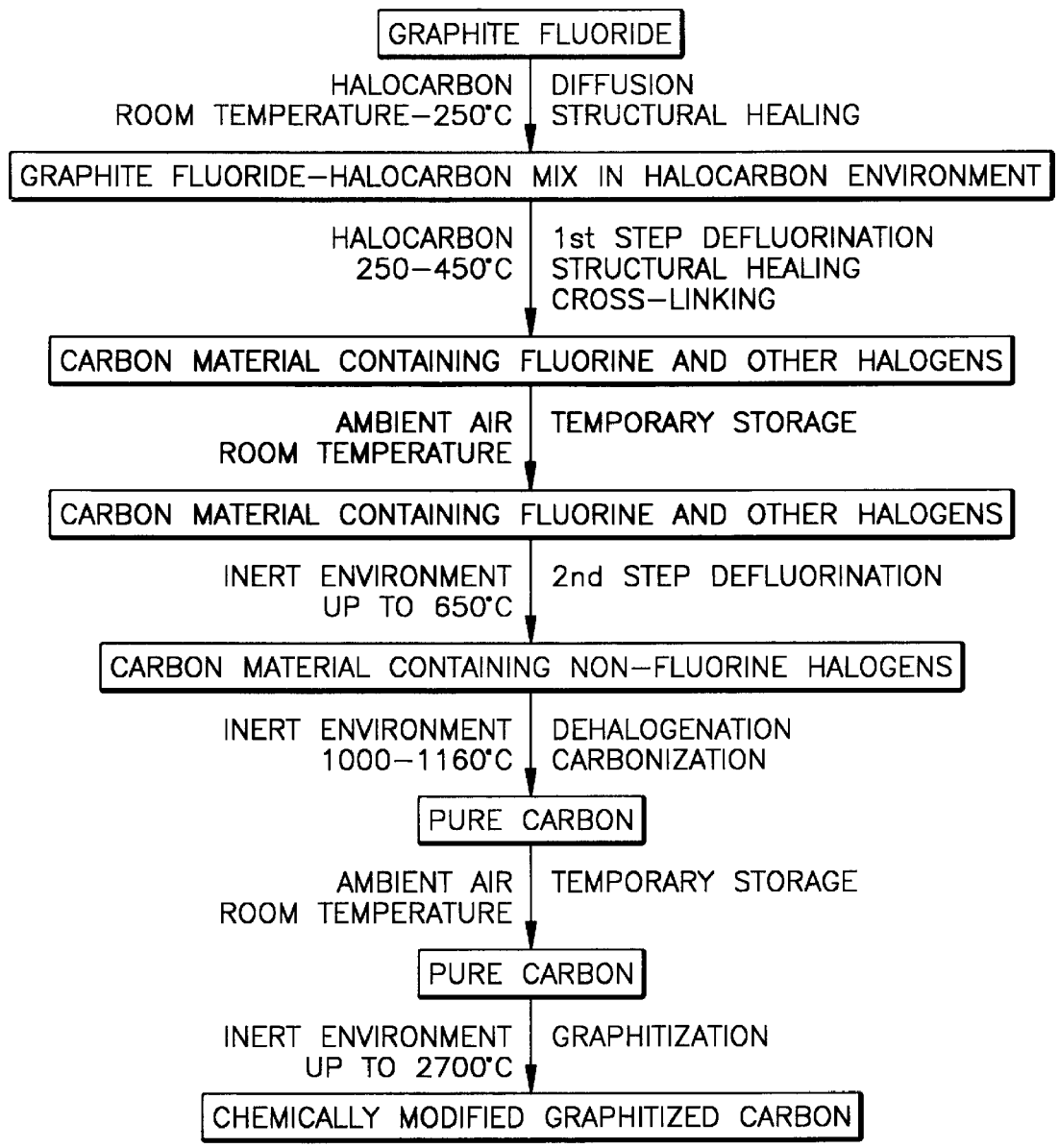
FIG. 1 illustrates steps in the process of this invention and indicates intermediate products that may have value in other processes.

FIG. 1 illustrates a process for producing chemically modified carbon materials from graphite fluoride ($\{CF_x\}_n$). The following paragraphs describe the process of FIG. 1.

The graphite fluoride is first exposed to a halocarbon (i.e., a halogenated hydrocarbon) at a temperature that may range from room temperature to approximately 250° C. in order to allow the halocarbon molecules to diffuse into the lamellar graphite fluoride structure. The halocarbon diffuses between the lattice planes of the structure. It is believed that the halocarbon is especially attracted to defects in the lattice structure and can effect "chemical healing" of some defects. The resulting first intermediate total system is formed comprising a graphite fluoride-halocarbon mix in a halocarbon environment;

The system is heated to a temperature ranging from 250° C. to 450° C. for a period of time to effect defluorination of the graphite fluoride. In practice, this time period may range from 2 to 10 hours, and may be selectively adjusted relative to the temperature used. This step (first step defluorination) removes the majority of fluorine from the graphite fluoride while allowing further penetration of the halocarbon. The halocarbon molecules are believed to migrate either to the sites where the fluorine atoms were located or to the sites of defects or damaged sites in the lamellar carbon structure, which defects may include the edges of the lamellae.

Some halocarbon molecules are of a size and reactivity that they may bridge the interlamellar distance and thereby produce cross-links between the lamellae in the lamellar crystal structure of the carbon material. An end result is that this type of bridging is believed to produce a new type of carbon material after graphitization: graphite with its adjacent carbon layers cross-linked. This product may be likened to cross-linked polymers. Indeed, the lamellae of the graphite lattice may be thought of as sheet-like polymer molecules and this process cross-links these polymers.

After the first step defluorination, the graphite fluoride becomes a carbon material containing some fluorine (up to 11% of the carbon weight) and the non-fluorine halogen or halogens of the halocarbon (up to 31% of the carbon weight).

Obviously, the halocarbons for this chemical reaction need to be small enough to be able to enter the lamellar structure of the graphite fluoride. The halocarbons that have been used in this work include carbon tetrachloride ($CCl_4$), bromoform (tribromo methane, $CHBr_3$), 1,1,2,2-tetrabromo-ethane ($Br_2HC—CHBr_2$), 1,4-dibromo-2-butene ($BrH_2C—CH=CH—CH_2Br$). All of these chemicals prevent damage during the defluorination of graphite fluoride and they are all believed also to "chemically heal" the structure of the graphite fluoride during the first step defluorination. As to the ability of the halocarbons to cross-link adjacent carbon layers in graphite fluoride, the effectiveness of $CCl_4$ is low to non-existent; the effectiveness of $CHBr_3$ or $Br_2HC—CHBr_2$ is moderate; and the effectiveness of $BrH_2C—CH=CH—CH_2Br$ is strong. Note that among the halocarbons tested, effectiveness increases with increasing length of the carbon chain of the halocarbon. Halocarbons having longer carbon chains than does $BrH_2C—CH=CH—CH_2Br$ may not necessarily follow this trend if the carbon chain is significantly longer than the interlamellar spacing of the graphite fluoride being treated.

No defluorination of graphite fluoride was observed at temperatures below 250° C. High-temperature defluorination may be possible, but the risk of an explosion involving graphite fluoride at high temperatures has precluded defluorination experiments at temperatures higher than about 450° C.

The product of the first-step defluorination process was removed from the halogen environment, stored in air, samples were examined and tests were run. This air storage is considered incidental to the process and not a necessary part of the process.

Further defluorination (second step defluorination) was accomplished in an inert atmosphere (nitrogen) at temperatures up to 600° C. to remove all of the remaining fluorine and some of the non-fluorine halogens introduced by the use of the halocarbons.

To remove the last vestiges of halogens from the carbon material and to effect complete carbonization of the remains of the halocarbons, the product from the second step defluorination was heated in an inert atmosphere (nitrogen) to a temperature in the range of approximately 1000° C. to approximately 1160° C., resulting in a product that appears to be purely carbon. This carbon material, however, exhibited some unusual chemical properties, which will be described later in this disclosure.

After another period of storage in air during sampling and testing, which air storage is again considered incidental to the process and not a necessary part of the process, the product was graphitized by heating to a temperature of up to approximately 2700° C. in an inert atmosphere of argon. This step was to increase the degree of graphitization and, therefore, increase the modulus and the thermal conductivity of the carbon material thus produced.

The properties of the carbon materials that are the product of this final heating step depend upon the temperature of this final heating step and upon the steps that had preceded it. In particular, the type of halocarbon used during the first step defluorination was found to significantly affect the modulus of the final product.

EXAMPLES

In the following specific examples, unless it is otherwise specified in the example, the starting $CF_x$ was Amoco P-100 graphitized carbon fiber (the P-100 fiber as commercially purchased had an interlamellar spacing of 3.37 Å, a fiber diameter of 10 μm, and a modulus of 724 GPa (GPa: 1 GPa=1.0×10⁹ Pascal)) that was first halogenated with a combination of bromine and iodine at temperatures ranging from 75° C. to 115° C. to form a bromine-iodine intercalation compound of graphite as an intermediate product, then reacting the intermediate product with fluorine gas at temperatures ranging from 275° C. to 450° C. to form the $CF_x$. The value of x in the $CF_x$ selected for the examples was approximately 0.68.

Example 1

A $CF_{0.68}$ sample was exposed at 250° C. and 1 atmosphere to vapors of 1,4-dibromo-2-butene ($BrH_2C$—$CH$=$CH$—$CH_2Br$) for 3 hours. It was found that two-thirds of the fluorine was lost from the graphite fluoride sample. A similar sample of the same $CF_{0.68}$ was found to be stable in air and in inert gas ($N_2$) under similar conditions of temperature, pressure, and time. This result indicates that 1,4-dibromo-2-butene actively reacts with graphite fluoride, removing fluorine from the graphite fluoride and forming bonds to carbon atoms in the graphite lattice. It is believed that this halocarbon (i.e., halogenated hydrocarbon) can form cross-links between two adjacent lattice layers in graphite fluoride if each end of the halocarbon attaches itself to carbon atoms in adjacent layers of the graphite fluoride lattice.

Example 2

A $CF_{0.68}$ sample was soaked in liquid 1,4-dibromo-2-butene for a period of 3 days at 50° C., removed from the liquid and then heated at 375° C. for 3 hours. The product thus formed was found to be $CF_{0.07}Br_{0.08}$. This intermediate was stored at room temperature in air and subsequently heated to 1100° C. in a nitrogen atmosphere, producing a final product with no detectable halogen and with a fiber diameter of 12.5 μm (i.e., 12.5×10⁻⁶ m). It is believed that the increase in fiber diameter is evidence of additional cross-linking of the carbon layers in the lattice.

After additional storage in air, the sample was heated in an argon atmosphere to 2700° C., after which attempts were made to measure its modulus relative to other carbon fibers. The comparitive test that was used could merely indicate that the modulus of the product fiber was much higher than that of Amoco P-120 (i.e., 827 GPa), which is a much more expensive commercially-available graphitized carbon fiber than P-100. The typical modulus of P-100 is 724 GPa, so this treatment of P-100 made a very significant increase in the modulus. In contrast, similar heating of P-100 to 2700° C. has been found to increase the modulus of the fiber only slightly.

The increased modulus of the defluorinated and then 2700° C. post-heated fibers is another indication of the presence of the cross-links between the adjacent carbon layers in the graphitized carbon fibers. It further indicates that some of these cross-links are stable at 2700° C. in an inert environment.

Example 3

A different starting material, a $CF_{0.9}$ fiber made from a commercially-available pitch-based carbon fiber,. Amoco P-25 (interlamellar spacing≈3.45 Å), was exposed at 1 atmosphere and 390° C. to vapors of 1,1,2,2-tetrabromo-ethane for a period of 3 hours. The treated sample was stored in air and subjected to heating in a nitrogen atmosphere to 1100° C. The mass of the resulting product was 34% greater than that of the original P-25 sample. This result indicates that the carbon atoms in the halocarbon molecules actually become part of the fiber by forming chemical bonds to the carbon atoms, probably at the active sites or defects in the graphite fluoride lattice.

Variations may be introduced in the process of FIG. 1. For example, the starting material need not be graphite fluoride through-and-through. It is anticipated that the process would operate on a starting material having a conventional graphitized carbon interior with graphite fluoride being on and near the surface. Since it is known, especially in the commercial carbon fiber business, that some carbon fibers receive a surface treatment of one kind or another, it would be natural to assume that a surface treatment that would form graphite fluoride on and near the surface might be useful. Thus, a starting material for the process of this invention might be made by a process involving high-temperature but incomplete fluorination of conventional graphitized carbon. The advantage of this modification is that the final product can be conventional graphitized carbon having a chemically modified carbon surface, thereby to allow the fabrication of composites having especially strong carbon-matrix bonds. The matrix material could be metal or ceramic.

The process of this invention could be applied to a starting material other than a graphite fluoride. The starting material could be a carbon fiber that has sustained structural damage during defluorination at too rapid a rate. In this modification of the process, the halocarbon can heal the defects and structural damage in the fiber. The advantage of effecting a healing of these defects is that it improves mechanical strength and thermal conductivity of the carbon fiber. By repeating the process several times, the mechanical strength and the thermal conductivity of these carbon-based materials can be further improved.

One should note that the process of FIG. 1 can be terminated at any step along the way if the product at that stage of the process should be of special value to the experimenter.

For example, the product of the 1000°–1160° C. heating has been shown, by means of energy disperse spectrum (EDS) measurements obtained by use of a scanning electron microscope (SEM), to contain nothing but carbon. This product is unusual. The composition is pure carbon, as is that of graphite. Its molecular structure, determined from X-ray diffraction measurements, appears to be the same as that of graphite. However, it is much more chemically reactive than is graphite. By direct contact with any one of several pure metals, namely Ti, Cr, Fe, Ni, Cu, Pb, and Sn, at temperatures of 1000°–1160° C., this carbon product can pick up a significant amount of these elements. Whereas the modulus, X-ray diffraction data, and electrical conductivity of the product are not changed by the presence of these metals on the carbon, one concludes that the elements are coated on the surface of the carbon material. This conclusion suggests that such a carbon material, pre-coated with a matrix material, can be used to produce (with the same material as a matrix) a carbon-matrix composite having superior bonding between the matrix and the carbon. The matrix material could be one of the metals listed to form a carbon-metal matrix composite. Preparing the composite with such a coated fiber would form metal-to-metal bonds, rather than metal-to-carbon bonds.

The product of the 1000°–1160° C. heating has been exposed to aluminum at 1000°–1060° C. with interesting results. The product after such exposure had a reduced modulus, noticably increased flexibility, and an increased percent elongation to failure.

The same product of the 1000°–1160° C. heating step is easily intercalated with magnesium at 1000°–1060° C. Magnesium does not easily intercalate into the normal graphite lattice.

Even more interestingly, it is an effective scavenger for manganese at high temperatures. For example, if it is in direct contact with solid carbon steel at 1100° C., it will take away the small amount of manganese present in carbon steel. Also, if it is in direct contact with pure solid manganese at 800° C., carbon fibers heavily coated with manganese are obtained. At 1000°–1160° C., a carbon fiber-manganese composite can be formed.

Figure 2:
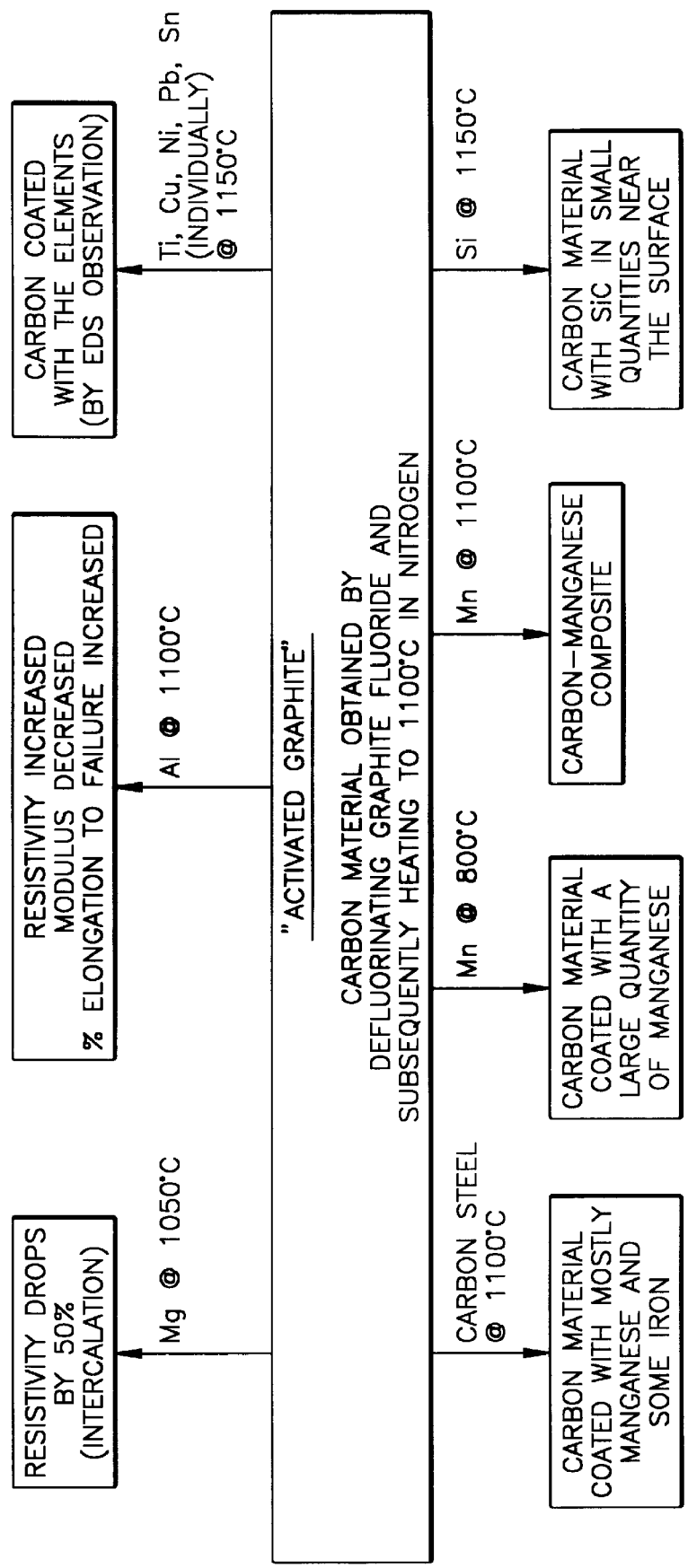
FIG. 2 illustrates the variety of observed reactions of "activated graphite", a product of this invention.

Of course, none of these reactions occur with conventional pure graphite. This new type of carbon material can be called "activated graphite" to distinguish it from both regular graphite (in terms of its chemical activity) and regular activated carbon (in terms of its molecular structure). This "activated graphite" appears to be a new material that has not heretofore been observed. The reasons for the observed reactions of "activated graphite" are not known. The variety of observed reactions of this "activated graphite" are summarized in FIG. 2.

Figure 3:
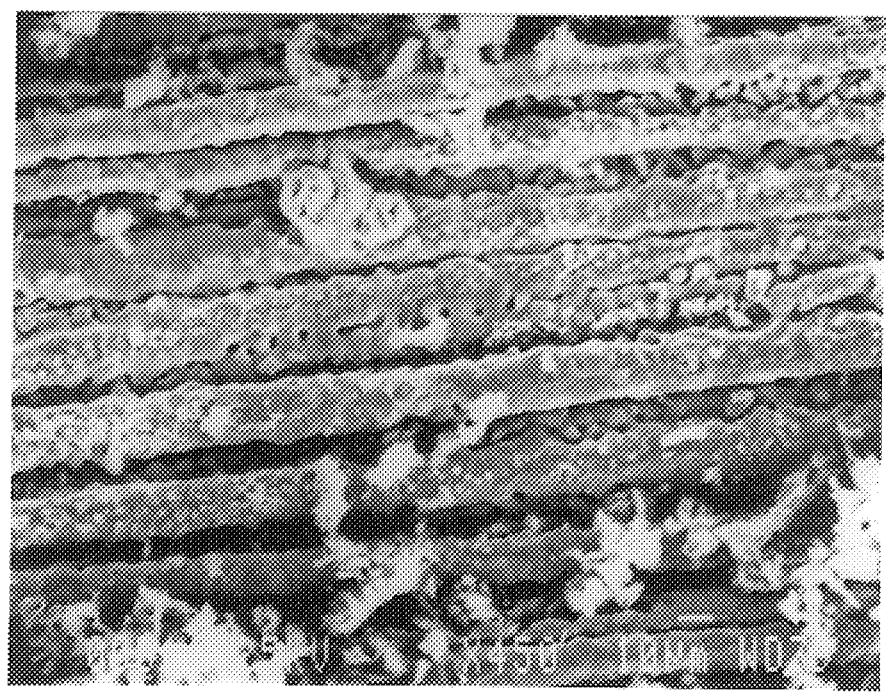
FIG. 3 is a photomicrograph that illustrates the coating of carbon fibers with manganese.

FIG. 3 is a photomicrograph that illustrates the coating of carbon fibers with manganese. This product was obtained by the process of FIG. 1 as follows. A $CF_{0.68}$ fiber sample was treated using $Br_2HC$—$CHBr_2$ at 400° C. for 4 hours, heated to 1100° C. in nitrogen, then heated to 800° C. in contact with manganese metal. This photograph indicates that solid manganese was strongly "drawn" to the activated graphite fibers at a temperature much lower than the melting point of manganese, which is 1244° C.

Figure 4:
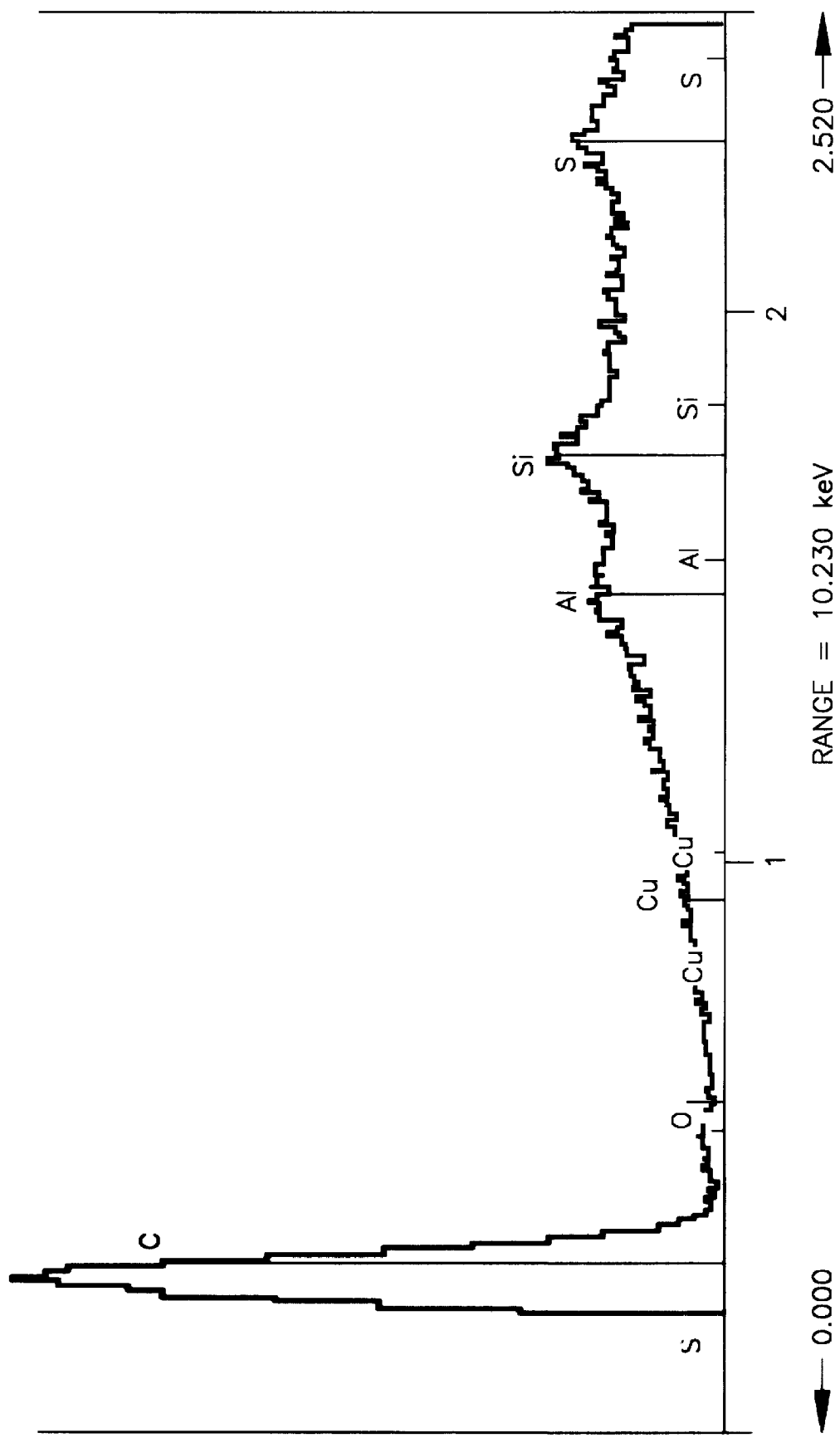
FIG. 4 illustrates an energy disperse spectrum (EDS) measurements obtained by use of a scanning electron microscope (SEM) for a typical fiber obtained by treating a $CF_{0.68}$ fiber sample through a portion of the process of FIG. 1, plus exposure to silicon.

FIG. 4 illustrates an EDS from a SEM for a typical fiber obtained by treating a $CF_{0.68}$ fiber sample through a portion of the process of FIG. 1 including 4 hours of exposure to $Br_2HC$—$CHBr_2$ at 400° C., heated to 1100° C. in nitrogen, then heated to 1100° C. in contact with a silicon wafer. The EDS data show that the "activated graphite" fibers can pick up a measurable amount of silicon from such simple contact with a silicon wafer, suggesting they can be advantageously used for the fabrication of carbon fiber-ceramic matrix composites.

In developing the process of FIG. 1, early attempts used sulfur vapor in the first step defluorination of graphite fluoride. Like halocarbons, sulfur is believed to have the ability to "chemically heal" carbon at the sites of defects or damaged sites in the lamellar carbon structure, which defects may include the edges of the lamellae. Sulfur cannot, however, form a bridge between the graphitic lattice planes of graphite fluoride. The process used is illustrated in FIG. 5.

Subsequent heating of the product from the first step defluorination using sulfur was applied in an inert atmosphere at a variety of temperatures ranging from 400° C. to 2700° C. resulting in what appears to be new carbon-based chemical compounds carbon sulfide (or, perhaps, graphite sulfide is appropriate). In this new compound, or series of compounds, the atomic ratio of sulfur to carbon appears to be affected by the processing temperature. If the product is processed to 400° C., the ratio is in the range of 0.1–1.0. If the product is processed to 1100° C., the resulting atomic ratio is in the range 0.03–0.1. At a processing temperature of 2700° C. the ratio is zero. These data, taken with the data regarding the stability of $CF_x$ imply that the products $CF_yS_{0.1-1.0}$ and $CS_{0.03-0.1}$ are stable in an inert environment at temperatures of 400° C. and 1100° C., respectively. The value of the sulfur-to-carbon atomic ratio depends on the processing temperature and the reactant to produce them. The $CS_{0.03-0.1}$ fibers were found to be much more flexible (i.e., lower modulus and higher strain to failure) and are much easier to handle than were the original reactant fibers (i.e., P-100 carbon fiber) that were used to make the graphite fluoride for this experiment.

To amplify the concept of the fibers being easier to handle, it was found that the fibers were far more easy to separate from a fiber bundle. The individual fibers seemed to have an exterior surface that would slide more easily over the surface of adjoining fibers, in contrast to the difficult separations often seen in similarly handling normal carbon fibers, wherein normal carbon fibers behave as if the surfaces were tacky or had fiber-to-fiber bridges on them.

Figure 5:
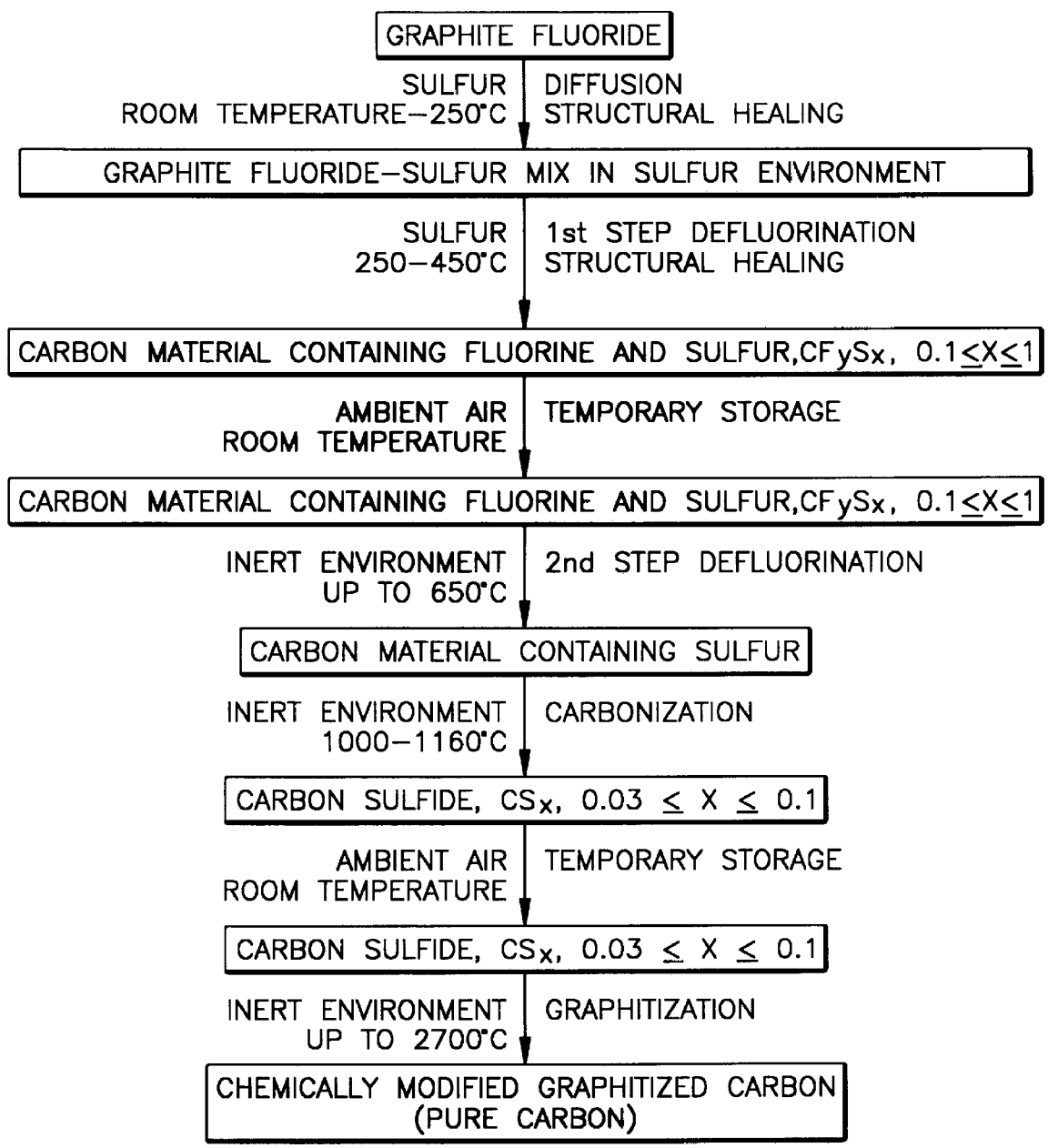
FIG. 5 illustrates steps in a modification of the process of this invention wherein the modification uses sulfur in the de-fluoridation of graphite fluoride and produces a new compound.
Figure 6:
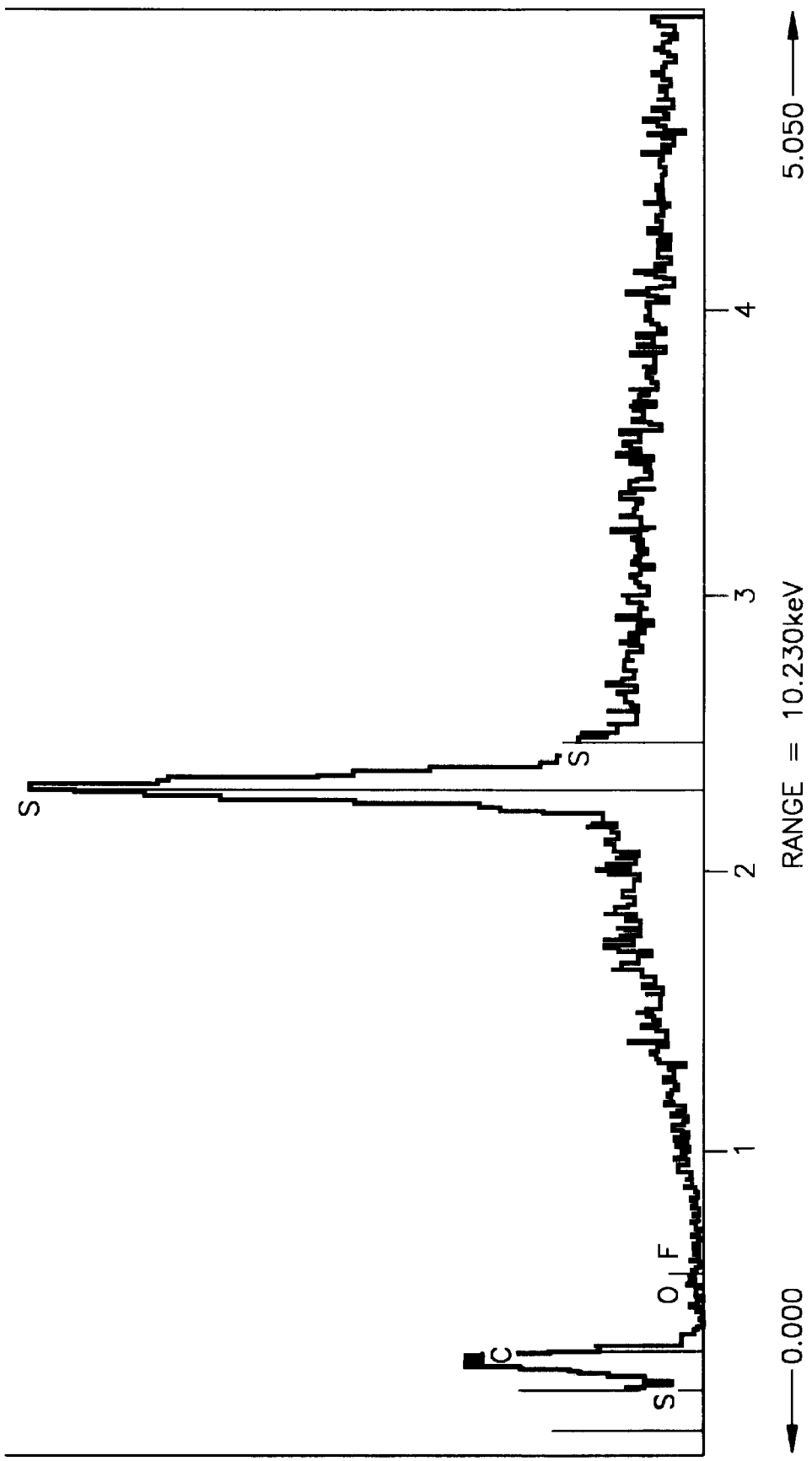
FIG. 6 illustrates an energy disperse spectrum (EDS) measurements obtained by use of a scanning electron microscope (SEM) for a typical fiber obtained by treating a $CF_{0.68}$ fiber sample through the process of FIG. 5.

FIG. 6 illustrates an EDS from a SEM for a typical fiber obtained by treating a $CF_{0.68}$ fiber sample through the process of FIG. 5 including 7 hours of exposure to sulfur vapors at 350° C., followed by heating to 1100° C. in nitrogen. The EDS data show that a large amount of sulfur is still present in the fiber after heating to 1000° C. One can conclude from this result that the sulfur is covalently bonded to the carbon. Thus, the fiber sample is representative of a new carbon sulfide compound, one exhibiting covalent bonding. The particular fibers for which the EDS data is presented is estimated to be $CS_{0.03}$.

In developing the process of FIG. 1, early attempts used ferric chloride (i.e., $FeCl_3$) in the first step defluorination of graphite fluoride. The first intermediate product was incidentally stored in air for a period of time before further heat treatment of up to 800° C. in an inert atmosphere. Subsequent work has shown that, at least in the case of using $FeCl_3$, the duration of this air (and humidity) exposure has a direct effect on the end product, which will be seen to include an oxide of iron. In contrast to the halocarbons tested, a large quantity of $FeCl_3$ enters the graphite fluoride lattice structure and forms a first stage graphite intercalation compound during the first stage defluorination. The composition of this new graphite intercalation compound was found to be $C_nFeCl_xF_y$, wherein: $2.1 \leq x+y \leq 5.2$; $0.9 \leq x \leq 3.3$; $0 \leq y \leq 4.5$; and $2.8 \leq n \leq 12$. The values of x and y depend upon the reaction conditions. The intercalated compound picks up moisture and oxygen during storage in ambient air. Further heating in an inert environment causes partial or complete de-intercalation, depending on the heating temperature. For a heating temperature of 800° C., it was found that the compound was completely de-intercalated; iron oxide and a trace of chlorine were found distributed evenly throughout the carbon material.

Figure 7:
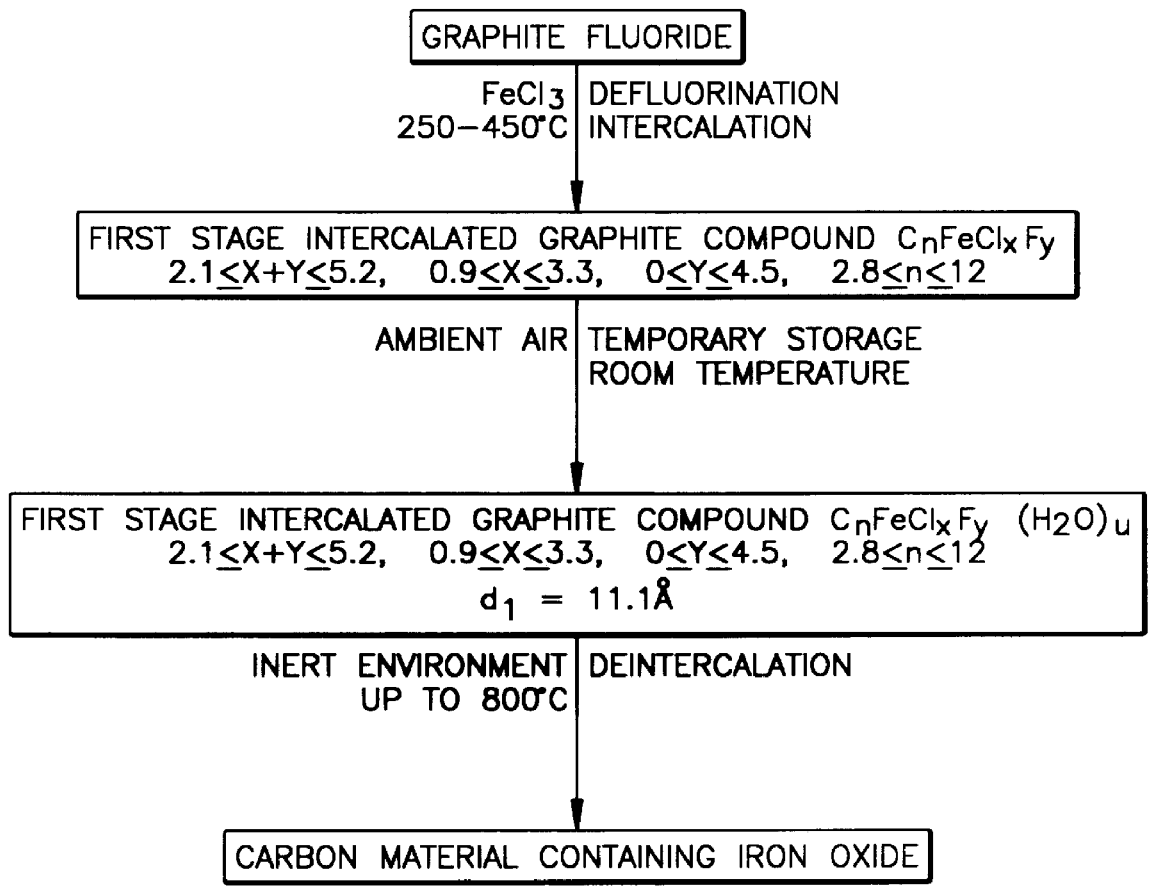
FIG. 7 illustrates steps in the process of this invention wherein the defluorination step utilizes $FeCl_3$.

The graphite fluoride reactant described as the starting material in FIG. 7 can be a fluorinated carbon with a low degree of graphitization (interlamellar spacing between 3.42 Å and 3.45 Å) or with a high degree of graphitization (interlamellar spacing less than 3.42 Å). In fact, this work shows for the first time that a pitch-based carbon fiber with a 3.45 Å interlamellar spacing (i.e., Amoco P-25) can be intercalated.

The process illustrated in FIG. 7 can be further modified by using a starting material that has been only partially converted to graphite fluoride. Such a starting material would appear as a core of pure carbon surrounded by and contiguous with a shell of graphite fluoride. The product derived from a material has an interior made of pure carbon and an exterior made of carbon containing evenly distributed iron oxide and chlorine. Such a product should be useful in making carbon-ceramic matrix composites with strong bonding between the carbon and the ceramic matrix.

Although the work herein described is reported as being done on carbon fibers, the technique can be applied to other forms of graphite as well. Specifically, experiments were conducted using $FeCl_3$ and other experiments were conducted with sulfur. Properties such as modulus and strength are not measurable on the powders, however, and one must surmise that similar effects take place if chemical changes similar to those observed with the fibers are observed with the powders.

While several embodiments of the invention have been disclosed, it will be appreciated that various changes and modification may be made to the process of the invention without departing from the spirit of the invention or the scope of the attached claims.

I claim:

1. A method of making chemically modified carbon-based materials from a precursor containing graphite fluoride, said method comprising:

exposing said precursor containing graphite fluoride to a halocarbon environment at a temperature between room temperature and 250° C., thereby allowing said halocarbon to diffuse into the lamellar crystal structure of said graphite fluoride so that a first intermediate total system is formed comprising a graphite fluoride-balocarbon mix in a halocarbon environment;

heating said first intermediate total system to a temperature of between 250° C. and approximately 450° C., thereby substantially defluorinating said graphite fluoride while also permitting said halocarbon to de-halogenate and form chemical bonds with and thereby bridge adjacent graphitic lattice planes formed from lamellae of said graphite fluoride and resulting in a first intermediate carbon material containing halogen;

heating to approximately 650° C. said first intermediate carbon material in an inert environment, thereby producing a fluorine-free second intermediate carbon material;

heating to a temperature in the range of approximately 1000° C. to approximately 1160° C. said second intermediate carbon material in an inert environment, thereby producing a halogen-free third intermediate carbon material; and heating to a graphitizing temperature said third intermediate carbon material in an inert atmosphere to produce a final product which is a graphitized, chemically modified carbon, wherein said precursor containing graphite fluoride comprises a carbon core surrounded by and contiguous with a shell comprising graphite fluoride and wherein said final product resulting from said method is a carbon core surrounded by and contiguous with a shell comprising said graphitized, chemically modified carbon.

2. A method of making chemically modified carbon-based materials from a precursor containing graphite fluoride, said method comprising:

exposing said precursor containing graphite fluoride to a $FeCl_3$ environment at a temperature between 250° C. and approximately 450° C., thereby substantially breaking C—F bonds in said graphite fluoride while also permitting said $FeCl_3$ to intercalate between graphitic lattice planes formed from lamellae of said graphite fluoride and resulting in a carbon material containing Fe, Cl, and F, wherein said precursor containing graphite fluoride comprises a carbon core surrounded by and contiguous with a shell comprising graphite fluoride and wherein a final product resulting from said method is a carbon core surrounded by and contiguous with a shell comprising said carbon material containing Fe, Cl, and F.

3. A method of making a carbon material coated with a substantially continuous film of an element selected from the group consisting of Ti, Cr, Fe, Ni, Cu, Pb, and Sn, starting with a precursor containing, graphite fluoride, said method comprising:

exposing, said precursor containing graphite fluoride to a sulfur environment at a temperature between room temperature and 250° C., thereby allowing said sulfur to diffuse into the lamellar crystal structure of said graphite fluoride so that a first intermediate total system is formed comprising a graphite fluoride-sulfur mix in a sulfur environment;

heating said first intermediate total system to a temperature of between 250° C. and approximately 450° C., thereby substantially defluorinating said graphite fluoride while also permitting said sulfur to form chemical bonds with and thereby to heal defects in graphitic lattice planes formed from lamellae of said graphite fluoride and resulting in a first intermediate carbon material containing only a trace amount of fluorine;

heating to approximately 650° C. said first intermediate carbon material in an inert environment, thereby producing a fluorine-free second intermediate carbon material;

heating to a temperature in the range of approximately 1000° C. to approximately 1160° C. said second intermediate carbon material in an inert environment, thereby producing a third intermediate product that is a halogen-free carbon-sulfide chemically modified carbon material having a lamellar structure and a chemical reactivity with said element that is much higher than that of graphite, and heating at a temperature in the range of approximately 1000° C. to approximately 1160° C. said third intermediate product in direct contact with said element.

4. A method of making a carbon-reinforced manganese matrix composite material, starting with a precursor containing graphite fluoride, said method comprising:

exposing said precursor containing graphite fluoride to a sulfur environment at a temperature between room temperature and 250° C., thereby allowing said sulfur to diffuse into the lamellar crystal structure of said graphite fluoride so that a first intermediate total system is formed comprising a graphite fluoride-sulfur mix in a sulfur environment;

heating said first intermediate total system to a temperature of between 250° C. and approximately 450° C., thereby substantially defluorinating said graphite fluoride while also permitting said sulfur to form chemical bonds with and thereby to heal defects in graphitic lattice planes formed from lamellae of said graphite fluoride and resulting in a first intermediate carbon material containing only a trace amount of fluorine;

heating to approximately 650° C. said first intermediate carbon material in an inert environment, thereby producing a fluorine-free second intermediate carbon material;

heating to a temperature in the range of approximately 1000° C. to approximately 1160° C. said second intermediate carbon material in an inert environment, thereby producing a third intermediate product that is a halogen-free carbon-sulfide chemically modified carbon material having a lamellar molecular structure and a chemical reactivity with manganese that is much higher than that of graphite, and heating at a temperature in the range of approximately 1000° C. to approximately 1160° C. said third intermediate product in direct contact with elemental manganese.

5. A method of making a carbon-reinforced manganese matrix composite material, starting with a precursor containing graphite fluoride, said method comprising:

- exposing said precursor containing graphite fluoride to a sulfur environment at a temperature between room temperature and 250° C., thereby allowing said sulfur to diffuse into the lamellar crystal structure of said graphite fluoride so that a first intermediate total system is formed comprising a graphite fluoride-sulfur mix in a sulfur environment;
- heating said first intermediate total system to a temperature of between 250° C. and approximately 450° C., thereby substantially defluorinating said graphite fluoride while also permitting said sulfur to form chemical bonds with and thereby to heal defects in graphitic lattice planes formed from lamellae of said graphite fluoride and resulting in a first intermediate carbon material containing only a trace amount of fluorine;
- heating to approximately 650° C. said first intermediate carbon material in an inert environment, thereby producing a fluorine-free second intermediate carbon material;
- heating to a temperature in the range of approximately 1000° C. to approximately 1160° C. said second intermediate carbon material in an inert environment, thereby producing a third intermediate product that is a halogen-free carbon-sulfide chemically modified carbon material having a lamellar structure and a chemical reactivity with manganese much higher than that of graphite, and
- heating at 800° C. said third intermediate product in direct contact with elemental manganese.

6. A method of making a carbon material coated with a substantially continuous film of an element selected from the group consisting of Ti, Cr, Fe, Ni, Cu, Pb, and Sn, starting with a precursor containing graphite fluoride, said method comprising:

- exposing said precursor containing graphite fluoride to a halocarbon environment at a temperature between room temperature and 250° C., thereby allowing said halocarbon to diffuse into the lamellar crystal structure of said graphite fluoride so that a first intermediate total system is formed comprising a graphite fluoride-halocarbon mix in said environment;
- heating said first intermediate total system to a temperature of between 250° C. and approximately 450° C., thereby substantially defluorinating said graphite fluoride while also permitting said halocarbon to form chemical bonds with and thereby to heal defects in graphitic lattice planes formed from lamellae of said graphite fluoride and resulting in a first intermediate carbon material containing only a trace amount of fluorine;
- heating to approximately 650° C. said first intermediate carbon material in an inert environment, thereby producing a fluorine-free second intermediate carbon material;
- heating to a temperature in the range of approximately 1000° C. to approximately 1160° C. said second intermediate carbon material in an inert environment, thereby producing a third intermediate product that is a halogen-free chemically modified carbon material having a lamellar structure and having a chemical reactivity with said element that is much higher than that of graphite, and
- heating at a temperature in the range of approximately 1000° C. to approximately 1160° C. said third intermediate product in direct contact with said element.

7. A method of making a carbon-reinforced manganese matrix composite material, starting with a precursor containing graphite fluoride, said method comprising:

- exposing said precursor containing graphite fluoride to a halocarbon environment at a temperature between room temperature and 250° C., thereby allowing said halocarbon to diffuse into the lamellar crystal structure of said graphite fluoride so that a first intermediate total system is formed comprising a graphite fluoride-halocarbon nmx in said environment;
- heating said first intermediate total system to a temperature of between 250° C. and approximately 450° C., thereby substantially defluorinating said graphite fluoride while also permitting said halocarbon to form chemical bonds with and thereby to heal defects in graphitic lattice planes formed from lamellae of said graphite fluoride and resulting in a first intermediate carbon material containing only a trace amount of fluorine;
- heating to approximately 650° C. said first intermediate carbon material in an inert environment, thereby producing a fluorine-free second intermediate carbon material;
- heating to a temperature in the range of approximately 1000° C. to approximately 1160° C. said second intermediate carbon material in an inert environment, thereby producing a third intermediate product that is a halogen-free chemically modified carbon material having a lamellar structure and having a chemical reactivity with manganese that is much higher than that of graphite, and
- heating at a temperature in the range of approximately 1000° C. to approximately 1160° C. said third intermediate product in direct contact with elemental manganese.

8. A method of making a carbon-reinforced manganese matrix composite material, starting with a precursor containing graphite fluoride said method comprising:

- exposing said precursor containing graphite fluoride to a halocarbon environment at a temperature between room temperature and 250° C., thereby allowing said halocarbon to diffuse into the lamellar crystal structure of said graphite fluoride so that a first intermediate total system is formed comprising a graphite fluoride-halocarbon mix in said environment;
- heating said first intermediate total system to a temperature of between 250° C. and approximately 450° C., thereby substantially defluorinating said graphite fluoride while also permitting said halocarbon to form chemical bonds with and thereby to heal defects in graphitic lattice planes formed from lamellae of said graphite fluoride and resulting in a first intermediate carbon material containing only a trace amount of fluorine;
- heating to approximately 650° C. said first intermediate carbon material in an inert environment, thereby producing a fluorine-free second intermediate carbon material;
- heating to a temperature in the range of approximately 1000° C. to approximately 1160° C. said second intermediate carbon material in an inert environment, thereby producing a third intermediate product that is a halogen-free chemically modified carbon material having a lamellar molecular structure and a chemical reactivity with manganese much higher than that of graphite, and
- heating at 800° C. said third intermediate product in direct contact with elemental manganese.

* * * * *